US009757801B2

(12) United States Patent
Günster et al.

(10) Patent No.: US 9,757,801 B2
(45) Date of Patent: Sep. 12, 2017

(54) METHOD FOR PRODUCING A MOULDED BODY AND DEVICE

(75) Inventors: Jens Günster, Berlin (DE); Cynthia Morais Gomes, Berlin (DE); Georg Berger, Panketal (DE)

(73) Assignee: BAM BUNDESANSTALT FÜR MATERIAL FORSCHUNG UND PRÜFUNG, Berlin (DE)

( * ) Notice: Subject to any disclaimer, the term of this patent is extended or adjusted under 35 U.S.C. 154(b) by 699 days.

(21) Appl. No.: 14/123,187

(22) PCT Filed: Jun. 1, 2012

(86) PCT No.: PCT/EP2012/060420
§ 371 (c)(1),
(2), (4) Date: Apr. 8, 2014

(87) PCT Pub. No.: WO2012/164078
PCT Pub. Date: Dec. 6, 2012

(65) Prior Publication Data
US 2014/0227123 A1    Aug. 14, 2014

(30) Foreign Application Priority Data
Jun. 1, 2011    (DE) .................. 10 2011 050 816

(51) Int. Cl.
| B22F 3/00 | (2006.01) |
| B28B 7/46 | (2006.01) |
| C04B 35/622 | (2006.01) |
| B33Y 70/00 | (2015.01) |
| B33Y 10/00 | (2015.01) |
| B28B 1/00 | (2006.01) |

(52) U.S. Cl.
CPC .............. *B22F 3/00* (2013.01); *B22F 3/003* (2013.01); *B22F 3/008* (2013.01); *B28B 1/001* (2013.01); *B28B 7/465* (2013.01); *B33Y 10/00* (2014.12); *B33Y 70/00* (2014.12); *C04B 35/622* (2013.01); *B22F 2999/00* (2013.01)

(58) Field of Classification Search
CPC .. B22F 3/00; B22F 3/003; B22F 3/008; B22F 2999/00; B22F 2202/11; B28B 1/001; B28B 7/465; C04B 35/622
USPC .......... 419/1, 66; 425/375, 78; 264/128, 430
See application file for complete search history.

(56) References Cited

U.S. PATENT DOCUMENTS

| 5,047,182 A * | 9/1991 | Sundback ............. C04B 35/622 419/66 |
| 5,204,055 A | 4/1993 | Sachs et al. |
| 5,427,722 A * | 6/1995 | Fouts .................... C04B 35/622 264/86 |
| 5,807,437 A | 9/1998 | Sachs et al. |
| 5,902,441 A * | 5/1999 | Bredt ....................... B28B 1/00 264/123 |
| 6,596,224 B1 | 7/2003 | Sachs et al. |
| 6,827,988 B2 * | 12/2004 | Krause .................. B28B 1/001 427/596 |
| 2003/0065400 A1 | 4/2003 | Beam et al. |
| 2006/0119017 A1 | 6/2006 | Tang |
| 2010/0279007 A1 * | 11/2010 | Briselden ............... B22F 3/008 427/243 |
| 2010/0323301 A1 | 12/2010 | Tang |

FOREIGN PATENT DOCUMENTS

| CN | 1351927 A | 6/2002 |
| CN | 101612793 A | 12/2009 |
| DE | 19715582 B4 | 10/1998 |
| DE | 10128664 A1 | 10/2003 |
| DE | 102006029298 A1 | 12/2007 |
| EP | 0431924 A2 | 5/1991 |
| EP | 1266878 A1 | 12/2002 |
| JP | H06218712 A | 8/1994 |
| JP | 2000/190086 A | 7/2000 |
| JP | 2002/507940 A | 3/2002 |
| JP | 2002/292751 A | 10/2002 |
| JP | 2005/067998 A | 3/2005 |
| JP | 2006/257323 A | 9/2006 |
| WO | 98/09798 | 3/1998 |

OTHER PUBLICATIONS

International Search Report, PCT/EP2012/060420, dated Dec. 3, 2012.

(Continued)

*Primary Examiner* — Helene Klemanski
(74) *Attorney, Agent, or Firm* — The Dobrusin Law Firm, P.C.

(57) ABSTRACT

A method for producing a molded body is proposed, comprising: applying a layer of particles and applying a binder and curing a molded body; and a device for producing a metallic or ceramic molded body, having a storage volume, which is configured for receiving a suspension of metallic or ceramic particles that are dispersed in a suspension fluid, a layer-forming application device, which is configured for removing an amount of suspension repeatedly from the storage volume and transferring it into a working volume and applying it there as a layer, a dehumidifying device, which is configured for dehumidifying the applied layer in the working volume, a binder application device, which is configured for applying a binder locally to the dehumidified layer in accordance with a layer model of the molded body to be produced, in such a way that particles in the dehumidified layer are adhesively bonded locally to one another and optionally in addition to particles of at least one layer lying under the dehumidified layer, and a demolding device, which is configured for demolding the molded body by detaching binder-free residual material from the particles bonded to another with the aid of the binder; and also a rapid prototyping method, comprising: producing a green body and sintering the green body.

22 Claims, No Drawings

(56) References Cited

OTHER PUBLICATIONS

Written Opinion of the International Searching Authority, PCT/EP2012/060420, dated Dec. 3, 2012.
International Preliminary Report on Patentability, PCT/EP2012/060420, dated Dec. 2, 2013.
European Priority Search Result, Application No. 102011050816.3 dated Feb. 16, 2013.
1st Chinese Office Action, Application No. 201280026888.5 dated May 20, 2015.
2nd Chinese Office Action, Application No. 201280026888.5 dated Jan. 15, 2016.
3rd Chinese Office Action, Application No. 201280026888.5 dated Aug. 15, 2016.
European Communication 94(3)EPC, Application No. 12725420.9 dated Jul. 20, 2016.
Japanese Office Action, Application No. 2014-513208 dated Oct. 2, 2015.
Japanese Office Action, Application No. 2014-513208 dated Mar. 24, 2016.

* cited by examiner

METHOD FOR PRODUCING A MOULDED BODY AND DEVICE

CLAIM OF PRIORITY

This application is a national phase filing under 35 USC §371 from PCT Application serial number PCT/EP2012/060420 filed on Jun. 1, 2012, and claims priority therefrom. This application further claims priority from German Patent Application Number DE 10 2011 050 816.3 filed on Jun. 1, 2011, incorporated herein by reference.

The invention relates to technologies for producing a moulded metallic or ceramic body. It falls within the discipline of generative manufacturing processes, particularly in the field of rapid prototyping and relates to the layered construction of a compact solid.

BACKGROUND OF THE INVENTION

In recent years, the demands on the manufacturing industry have undergone significant changes, particularly in the area of development and prototype manufacturing. As product variants are becoming steadily more numerous and complex, so the need for prototypes is also growing constantly. Many new technologies have emerged, which are described by the umbrella term "rapid prototyping" or "rapid manufacturing" and are used to meet the demand for more flexible manufacturing.

An significant feature of these processes is the creation of process control data from CAD geometry data with subsequent control of processing facilities. All such processes share the following features. Shaping is carried out not by removing material, but by adding material, or by phase transition of a material from liquid to solid, or a starting material in powder form is compacted. Moreover, all methods are based on part geometries from layers of finite thickness, which are built up directly from CAD data using a slice process.

The methods currently available differ in respect of the initial state of the materials, that is to say solid, liquid or gas-phase, in which the layer addition or construction process takes place. In the following, various methods will be discussed.

Selective Laser Sintering (SLS) was originally developed for powders consisting of nylon, polycarbonate and waxes, and was later applied to metal powders. Powder layers are sintered onto a green body in a reactor, wherein the melting temperature is reached through the use of $CO_2$ lasers.

In Multiphase Jet Solidification (MJS), mixtures of metal powder and binder are processed in a manner similar to the injection moulding method by computer-controlled, movable nozzles to form layers, which in turn build the component.

Stereolithography uses liquid UV-sensitive polymers as starting materials; the polymers are cured by laser radiation one layer at a time and deposited on the substrate. The workpiece is built progressively on a platform that descends by the corresponding layer thickness after the respective layer has cured in the resin bath.

Liquid polymers are also used as the raw materials in Solid Ground Curing (SGC). Thin polymer layers harden after exposure to UV radiation at the desired locations and thus build a component one layer at a time.

Simultaneous shot peening (SSP) is the name for a method in which the surface of a suitable form is mapped by spraying with molten metal. This mapping can be used as part of a die casting tool or press form.

Very similar to the MJS process is Fused Deposition Modeling (FDM). Here too, a nozzle is controlled using NC as it travels over the height-adjustable workpiece that is to be made. The component is built by cutting away molten material layer by layer and lowering the platform correspondingly.

Laminated Object Manufacturing (LOM) was originally developed for manufacturing paper or plastic components. A laser cuts the corresponding component layers out of individual layers, and these are laminated together using adhesives to create the workpiece.

Document EP 1,266,878 describes an "LSD method" and a device for carrying out the method, in which ceramic green sheets are applied using a process derived from tape casting. After this, and similarly to Selective Laser Sintering, a laser is used to harden/sinter specific areas of the ceramic green sheets. The moulded body is built up in layers by sintering selected areas of the ceramic material with the laser beam. In the known method, layers of a liquid suspension or a plastic mass are applied repeatedly and then dehumidified. Each dehumidified layer is then sintered at selected locations using the laser beam at selected locations to form the moulded body. In the known method, the laser is used to write the layer information into the dried green sheet via a sintering process. Laser irradiation certainly causes local sintering of the green sheet, so that irradiated areas can subsequently be detached from the green body using water as the solvent when demoulding, but the laser-irradiated areas possess different properties from conventionally sintered ceramics. Even subsequent conventional sintering cannot influence the properties of the component constructed in this way such that a component with characteristics comparable to a conventionally sintered component is produced.

3D binder printing processes are also known, for example from the document WO 98/09798. In this case, as part of a process in which materials are bonded in layers, a bonding agent is activated after a layer of powder or granulate has been applied. The bonding agent serves as an adhesive for the layers that are applied in steps. Materials suitable for this purpose are described in document DE 10 2006 029 298 A1, for example.

SUMMARY OF THE INVENTION

The object of the invention is to provide improved technologies for producing a metallic or ceramic moulded body, by which moulded bodies having a desired material density can be produced reliably while treating the production system carefully.

This object may be achieved with a method for producing a metallic or ceramic moulded body according to the teachings herein. Also described is a device for producing a metallic or ceramic moulded body.

The invention includes the idea of a method for producing a moulded body from metallic or ceramic material, wherein the method comprises the steps of:
forming a moulding body from a metallic or ceramic material by performing the following steps repeatedly:
applying a layer of a suspension of metallic or ceramic particles that are dispersed in a suspension fluid in a working volume,
dehumidifying the applied layer in the working volume, and
applying a binder locally to the dehumidified layer and curing the binder in accordance with layer model of the moulded body to be produced in such manner that particles in the dehumidified layer are adhesively bonded to each other locally and optionally also to particles of at least one layer below the dehumidified layer, and demoulding the moulded body by detaching binder-free residual material from the particles that are bonded to each other with the aid of the binder.

According to a farther aspect of the invention, the creation of the moulded body comprises the locally limited application of a liquid binder that alters the solubility of the particulate agglomerate. In this context, the term particulate agglomerate is understood to mean the layer of particles or the particulate material applied. This locally limited application of the liquid binder that alters the solubility of the particulate material according to the layer model of the moulded body to be created, has the effect of altering the solubility of the particulate material in the layer compared with the solubility of the particulate material that is not provided with the binding agent, or the solubility of desired portions of the layer is changed. In this way, the solubility of the portions of the particle layer intended for the structure of the moulded body itself is changed. The moulded body thus emerges when the surrounding particulate material is demoulded. According to a further aspect of the invention, a device for manufacturing a metallic or ceramic moulded body having the following features is created:

a storage volume that is configured to receive a suspension of metallic or ceramic particles that have been dispersed in a suspension fluid, a layer-forming application apparatus that is configured to repeatedly take a quantity of suspension from the storage volume and transfer it to a working volume, and to apply it there as a layer, a dehumidifying device that is configured to dehumidify the applied layer in the working volume, a binding agent dispensing device that is configured to apply a binding agent locally to the dehumidified layer according to a layer model of the moulded body to be produced, such that particles in the dehumidified layer are adhesively bonded to each other and optionally also to particles of a layer below the dehumidified layer, and a demoulding unit that is configured to demould the moulded article in that binder-free residual material is detached from the particles that are bonded to each other with the aid of the binder.

In the suggested method, the metallic or ceramic moulded body is produced in a working volume that is formless with regard to the exterior shape of the moulded body that is to be produced by applying multiple layers of a suspension of metallic or ceramic powder particles dispersed in a suspension fluid one after the other. After each application, the layer applied is dried, and a binder is then applied locally to bind the particles in the dried layer to each other in accordance with the layer model. Alternatively, the binder may be applied in such manner that the binder spreads not only through the intended areas of the dried layer, but also into one or more underlying layers so that the currently applied layer is connected to the layers beneath it. The distribution of the binder may be adjusted for example by means of the pressure with which the binder is applied to the dried layer. The local application of the binder is controlled according to an electronic dataset for the layer model of the moulded body that is to be produced. The moulded body to be produced is deconstructed into layers beforehand in the layer model, from which a dataset adapted for the manufacturing process is derived for controlling the process. The provision of the layer model is known per se and will therefore not be further explained here.

The thickness of the suspension layers applied successively is preferably between about 1 µm and about 200 µm.

The suggested method is a rapid prototyping method. Sometimes the term rapid manufacturing method is also used.

After the repeated application of the suspension layers and processing thereof have been completed, the moulded body is demoulded. This means that the particles that form the moulded body, which have been connected to each other by means of the binder, are separated from the binder-free residual material in the working volume. The working volume itself is not formative of the moulded body that is produced. Rather, the exterior shape of the moulded body is created through the local application of the binder, which ensures that the particles continue to hold together after curing.

A preferred refinement of the invention provides that the binder is applied locally using a printing device. The application of the binder with the printing device is advantageously carried out by means of a suitable print head. The printing apparatus is used to produce the moulded body in a three-dimensional printing process.

In an expedient variant of the invention, it may be provided that the applied layer is heated during dehumidification.

An advantageous embodiment of the invention provides that the moulded body is produced as a porous moulded body.

A further development of the invention preferably provides that one or more of the following set of steps are carried out in order to cure the binder: Air drying, heat supply and UV light irradiation. The binder may be cured by air drying alone. Additionally or alternatively, heating and/or irradiation with UV light may be used to cure the binder after it has been applied.

A refinement of the invention may provide that demoulding is carried out at least partially in a liquid bath. The liquid may be for example a water bath. The particles that are not bound with binder are separated from the moulded body with the aid of the liquid bath.

A preferred embodiment of the invention provides that the moulded body is produced with a density of at least 60% v/v, preferably at least 65% v/v and more preferably at least 70% v/v.

According to a typical embodiment, a method for producing or creating a moulded body or a green body is suggested, wherein a density of the green body is at least 60% v/v of the average material density of a ceramic component of a suspension if the density of the green body is defined as the quotient of a mass of the green body and a volume that is calculated on the basis of exterior contours of the green body. In the case of aluminum oxide ($Al_2O$) with a theoretical density of 3.94 $g \cdot cm^{-3}$, this means that $Al_2O_3$ green bodies that are constructed in layers by slip deposition have a density greater than 2.36 $g \cdot cm^{-3}$.

According to a further embodiment, a method for producing or creating a moulded body or a green body is suggested, wherein the layer is created with the aid of a hollow doctor blade. In this case, the suspension is discharged through the hollow doctor blade to form the layers. The advantages of this approach include the fact that the slip that is fed to the hollow doctor blade is discharged consistently and uniformly through the slit-shaped outlet thereof and enables the layer to be spread with defined thickness.

In a practical variation of the invention, it may be provided that when the layer is applied a green sheet is formed by spreading a suspension of ceramic particles. The suspension of ceramic particles is also called slip. A ceramic moulded body prepared in this way is called a green body.

An advantageous embodiment of the invention provides for the use of an organic binder that is not soluble in water and/or not soluble in organic solvents after curing. This prevents particles from becoming separated from the bonded layers unintentionally during the subsequent demoulding.

A preferred refinement of the invention provides that an inorganic binder is used. For example, a binder based on a colloidal $SiO_2$ solution may be used.

In an advantageous embodiment of the invention, it may be provided that the demoulded body is sintered. In one variant, the organic binder is pyrolysed when the moulded body is sintered. In this or other variants, it may be provided that the moulded body is further compacted by sintering, so that the moulded body is produced with a material density that is greater than the material density of the moulded body after demoulding.

With regard to the device for producing the metallic or ceramic moulded body, it may be provided that the binder dispensing device is a printing device, with which the binder is applied locally to the previously dehumidified layer in similar manner to ink jet printing technology.

Part of the demoulding device for demoulding the moulded body may be a liquid bath in which the binder-free residue particles are detached from the particles that are connected to each other with the aid of the binder.

The layer-forming application device may comprise a feeder device for transporting the suspension material required to form a layer from the storage volume into the working volume. A doctor blade device may be provided to assist with the film formation.

The doctor blade device may comprise in particular a hollow scraper blade, wherein the hollow blade encloses a hollow volume that has two openings: a hose port for delivering the slip and a slit-shaped outlet opening for discharging the slip. The volume is designed so as to enable the slip that is fed in through the hose port to be discharged uniformly and consistently through the slit-moulded outlet opening. The slit-moulded outlet opening extends substantially across the width of the doctor blade. The slip emerging from the slit is spread to form a layer of defined thickness by the doctor blade.

According to preferred embodiments of the suggested method, the layer with defined thickness obtained in this way has a constant thickness. A significant feature of a layer of defined thickness obtained in this way consists in that each deposited layer has a constant height over its entire extent and is thus particularly characterized by an even, uncorrugated and accordingly flat surface. Each layer created with the hollow doctor blade according to the suggested method is thus characterized in that it advantageously comprises an even, uncorrugated surface.

Consequently, the moulded body obtained according to the method consists entirely of layers that are intrinsically flat and it is therefore free from corrugations, since each slip layer is always applied to a completely flat surface. This provides particular advantages for uniform drying and the uniform adhesion of subsequently superposed layers achievable thereby, which after all characterize the layer-built moulded body.

An exemplary embodiment of the doctor blade consists of two parallel rectangular panels arranged at a defined distance from one another. The rectangular panels are sealed off from one another on three sides, so that an open cavity is formed on one side. The open side, or the single-sided opening of the hollow blade, serves as a slit-like outlet opening for the slip, wherein the slip may be supplied via a hose on one of the panels.

In this case, the hose port may be designed for example such that one of the panels has an opening that is directed towards the open cavity and opens into a hose nipple or other type of connector for a hose that supplies the slip on the outside of the panel.

In one embodiment, the dehumidifying device is designed with a heater that is configured to supply heat to the applied suspension layer so that it is dried.

DESCRIPTION OF PREFERRED EMBODIMENTS OF THE INVENTION

In the following, the invention will be explained in greater detail with reference to preferred embodiments. Also described are variations of a method for producing a metallic or ceramic moulded body, at least some of which may be ascribed to rapid prototyping or rapid manufacturing.

In the process, the component to be produced is first designed in normal manner with a computer program, cut into suitable layers and exported as a data set. With the cutting into layers, a layer model of the moulded body is created. The data set contains layer information for the moulded body that is to be produced.

A computer that is part of the production system interprets the layer data to derive control data therefrom, with which the production system is controlled, initially for forming the thin suspension layers, referred to in the case of a ceramic material as green sheets. Usable ceramic powder materials include for example porcelain, $Al_2O_3$, AlN, $SiO_2$, $Si_3N_4$.

The result of the production process is a prototype that has been produced without a mould, a semi-finished product, for example.

In order to produce the suspension layers, a specially adjusted suspension is used, called a slip in the case of a ceramic material suspension. Compared with the conventional casting slip, the suspension in this case must usually be more viscous with lower water content. In one possible variant of the method, a slip serves as the foundation for series production and only has to be thickened by increasing the proportion of solid content, or it may be used directly. Thus, in this case the production process for the slip is very inexpensive.

The advantage of using a liquid suspension over the use of powder according to the prior art is that it increases the material density, which in the case of a ceramic material is also called the green density. In the powder state, the powder particles are electrostatically charged and repel each other, resulting in a low bulk density, and relatively thick layers. Both effects lead to unsatisfactory mapping accuracy.

In the suggested method, the suspension that is prepared for producing the moulded body is pressed out of a reservoir or storage vessel by a conveyer device using a hollow doctor blade with a gap width of 500 μm for example. A manipulator moves the doctor blade at a vertical distance from about 1 to about 100 μm over a heated ceramic panel, so that the suspension in a working volume is applied in a thin layer having defined thickness. The panel surface is initially at a temperature below 100° C. to prevent the water content in the suspension from boiling when water-based slips are used during deposition of the first layers. As the number of layers increases, the temperature can be raised significantly, since the layers deposited previously are highly absorbent and initially extract the moisture from the new layer within fractions of a second. The new layer is stabilised thereby, and the moisture is evaporated within less than 30 seconds.

Besides drying from below via the heated panel, alternatively or additionally a radiant heater can be used together with a fan. An additional means for drying from above might be necessary if fragments produced have an insulating effect and thus cause the temperature of the upper layers to be too low to enable satisfactorily rapid drying as the thickness of the layer structure increases. The layers that are producible by this method have a density comparable to conventionally produced green bodies of about 65% v/v.

A binder is locally sprayed onto the dried layer via a print head of a printing device, similarly to three-dimensional printing. The binder wets the ceramic or metallic particles and so penetrates the layer. This penetration of the layer is required in order to connect the desired particles in the layer cross-section and to bind the top layer locally to underlying layers. The quantity of sprayed-on binder is metered so that the binder is able to penetrate the layers of the body down to a desired depth. This penetration depth of the binder varies according to the layer thickness of the individual applied layer and the desired degree of penetration of the binding agent in deeper layers. The binder has the properties of curing after spraying, by exposure to air, heat, UV light, 2-phase spraying and/or the like for example, and that it then becomes insoluble or only poorly soluble by other media that dissolve the moulded body that has not been treated with the binder.

After the printing operation is complete, a new layer with a thickness from about 1 µm to about 100 µm is applied and dehumidified, and the printing process begins again. In this way, the moulded body is built up successively one layer at a time according to the layer model. After completion of the build-up phase, the moulded body, which now consists of a plurality of layers, is placed in a water bath or other media that dissolve the parts of the moulded body without binder, and the binder-free areas are dissolved. In this manner, a component emerges from the moulded body.

After completion of the thermal curing cross-linking by laser radiation, a new layer having a thickness of 1-500 µm, preferably from 5 to 300, particularly from 25 to 150 µm is applied and dehumidified, then binder is applied again and cured/crosslinked. In this way, a component is built up successively layer by layer. After completion of the build-up phase, the green body, which now consists of a plurality of layers, is placed in a water bath or another medium which dissolves and/or washes out the part of the green body that has not been cured/crosslinked by the binder. The binder-free areas of the green body are dissolved completely and the component emerges from the green body.

The properties of the component that is generated in this manner are equivalent to those of a conventional green body of which the pore volume is partly filled with a binder. When an organic binder is used, the binder is easily driven out when the body is sintered. In the case of an inorganic binder, for example colloidal $SiO_2$ solution, the density of the green body obtained thereby may be even higher than with a conventionally prepared ceramic, polymeric or metallic green body.

The properties of moulded bodies produced in this way using a ceramic particulate material equivalent to those of a conventional green ceramic body, the pore volume of which is partly filled with a binder. The density of the unsintered ceramic green body is higher than with all known generative processes.

In the case of an organic binder, the binder is easily driven out during sintering. In the case of an inorganic binder, for example systems based on colloidal $SiO_2$ solutions, the density of the body may even be greater than that of a conventionally prepared ceramic green body.

For the first time in a generative manufacturing process, for example rapid prototyping, ceramic or metal moulded bodies can be generated that have a density comparable to or even greater than conventionally produced green bodies, particularly if ceramic materials are used.

According to the prior art, suspensions (also called slips for ceramics) are used for applying powder layers in three-dimensional printing, but are not applied with a defined layer thickness. The suggested use of the suspensions entirely eliminates the problem of contaminating the print head by airborne powder particles. In the printing process with powder coatings, as provided in the prior art, loose ceramic particles are constantly propelled toward the print head, where they clog the print nozzles.

The problems encountered due to very fine particles having low flowability in the dry state and therefore not being suitable for use in layer application below a certain minimum size, or associated with the significant technological effort required to generate homogeneous layers of very fine powders, are also avoided with the suggested method. It is precisely these problems that are avoided by applying a suspension. Fine particles are advantageous for the surface quality of the prototype, the sinterability thereof, or for adjusting certain particularly finely crystalline structures in the ceramic component, for example.

In contrast to the powder bed, not only does the material bed (green bed) produced by the suggested method have greater green density, it also supports the sintered prototype. This eliminates the previous modeling and subsequent removal of support structures, which were very time consuming.

For the first time, the suggested method enables green bodies to be generated by rapid prototyping with properties relating to density and strength that are comparable to conventionally produced green bodies. With a subsequent sintering step, this enables ceramics having properties comparable to ceramics prepared in a conventional process.

In one embodiment, it is possible to use conventional slips to build prototypes, thereby rendering the method particularly cost effective.

The features of the invention disclosed in the preceding description and the claims may be significant either individually or in any combination thereof for the realization of the invention in any of its different variations.

Known "rapid prototyping" or "rapid manufacturing" methods are based on the creation of process control data from CAD geometry data with subsequent control of processing facilities. In "Selective Laser Sintering" (SLS), powder layers are sintered onto a green body in a reactor, wherein a $CO_2$ laser heats the powders locally to its melting temperature. In "Multiphase Jet Solidification" (MJS), the component is built up in layers from mixtures of metal powder and binder with computer-controlled, movable nozzles.

Similarly, in "Fused Deposition Modeling" (FDM), molten material is deposited using an NC nozzle and the component is built layer by layer by lowering the platform correspondingly. With Stereolithography, liquid, UV-sensitive polymers are cured one layer at a time by laser irradiation on a substrate that is lowered incrementally. If a UV floodlight is used instead, the process is called "Solid Ground Curing" (SGC). In "Simultaneous Shot Peening," (SSP), the surface of a suitable negative mould is mapped by spraying with liquid metal. "Laminated Object Manufacturing" (LOM) involves constructing component layers from laser-cut sheets of material and then laminating them to the workpiece using adhesives. In the same way. $Al_2O_3$ foils that have been produced with doctor blades can also be cut and laminated. According to DE 101 28 664, ceramic moulded bodies are formed by sintering selected locations of a ceramic material with a laser beam. The method comprises the steps of: —applying a layer of a liquid suspension or plastic mass, —dehumidifying each applied layer, and —sintering selected points on each dehumidified layer with the laser beam, and this process is called Layer-wise Slurry Deposition (LSD) for short. In 3D printing, layers of polymeric, metallic or ceramic powder are applied and solidified site-selectively by local injection of a binder using a technology similar to ink jet printing. Document U.S. Pat. No. 6,596,224 describes a comparable method, except that the respective powder layers are produced not as loose bulk powder beds, but as compact powder layers by slip casting, although without a defined thickness, so that they are wavy and thus not flat.

According to one embodiment, a method for producing a moulded body—that is a green body—is suggested, wherein the method comprise: (a) forming a layer from a binder-containing suspension that is laser-curable and/or laser-crosslinkable, (b) curing and/or crosslinking the binder by local exposure to a laser; optional repetition of steps (a) and (b), wherein an additional layer is applied to a cured and/or crosslinked layer; (c) washing out and/or dissolving portions that have not been cured and/or crosslinked in a liquid medium, to obtain the green body.

Advantages consist in that the suggested method is suitable for rapid prototyping by local thermal or photonic curing and/or crosslinking of highly compact powder layers consisting of different solids sprayed with binder. The process advantageously requires no printer technology, and is therefore not dependent on the use of printer nozzles. A particular advantage is that the density and strength of the green bodies obtained thereby are equal to or greater than those of green bodies produced conventionally from suspensions of the same composition.

According to another embodiment a method is suggested liar producing a moulded body or green body, wherein the layer is generated from a suspension in which the binder is contained. The binder content thereof is less than 10% v/v.

According to another embodiment, a method for manufacturing or producing a moulded body or green body is suggested, wherein the generation of the layer includes at least partial penetration by a binder into a dehumidified layer of a suspension that contains no binder. This offers advantages of fewer limitations with respect to the composition of the suspension, since the binder has no effect on the dispersion stability of the suspension. On the other hand, it is possible to create a dehumidified layer having higher density. Separation during settling of the suspension can be prevented entirely.

According to another embodiment, a method for creating or producing a moulded body or green body is suggested, wherein penetration by the binder is effected by spraying the dried layer with the binder and/or by immersing the dried layer in the binder, or in a liquid that contains the binder. Advantages of this embodiment ensue from a broader range of usable binders and the capability to adjust and control the degree to which the binder penetrates the dried layer via the concentration of the binder in the solution thereof.

According to another embodiment, a method for creating or producing a moulded body or green body is suggested wherein the cured and/or crosslinked binder is not soluble in the liquid medium. In this manner, those portions that have not been solidified by the binder may be washed out selectively.

According to another embodiment, a method for creating or producing a moulded body or green body is suggested wherein the medium comprises water and/or an organic solvent, and wherein the organic solvent is chosen from: acetone, cyclohexane, dioxane, n-hexane, n-octane, toluene, trichloroethanol, dimethyl ethyl ketone, isopropanol, ethyl alcohol, methyl ethyl ketone, or mixtures thereof.

According to another embodiment, a method for creating or producing a moulded body or green body is suggested wherein a density of the green body is at least 60% of the average density of a ceramic material component of a suspension when the density of the green body is defined as the quotient of a mass of the green body and a volume that is calculated on the basis of exterior contours of the green body. In the case of aluminum oxide ($Al_2O_3$) with a theoretical density of 3.94 $g \cdot cm^{-3}$, this means that $Al_2O_3$ green bodies that are constructed in layers by slip deposition have a density greater than 2.36 $g \cdot cm^{-3}$.

According to another embodiment, a method for creating or producing a moulded body or green body is suggested wherein the layer is created using a hollow doctor blade. In this case, the suspension is discharged through the hollow doctor blade to form the layers. The advantages of this approach include the fact that the slip that is fed to the hollow doctor blade is discharged consistently and uniformly through the slit-shaped outlet thereof and enables the layer to be spread with defined thickness.

According to another embodiment, a method for creating or producing a moulded body or green body is suggested wherein the solid component of the suspension is selected from a polymer, a metal, a ceramic material or from a mixture containing at least one polymer, one metal or one ceramic substance. Advantages of this embodiment are derived from the ability to adjust the properties of the green body and thus also to adjust and vary the properties of the sintered component correspondingly, in particular with regard to the electrical conductivity and/or the dielectric constant thereof.

According to another embodiment, a method for creating or producing a moulded body or green body is suggested wherein the dimensions of the layer correspond to indicated dimensions of a layer of a model that is constructed in layers. The advantage of this embodiment is that layers of defined thickness can be generated, and so layer information can be transferred directly from the virtual model used for the construction, which functions with uniform film thicknesses, to the construction process of the green body or a sintered ceramic component. The capability to transfer directly from the model to the prototype simplifies the manufacture of the prototype and facilitates optimisation of the process parameters According to another embodiment, a method for producing a moulded body or a green body is suggested, wherein the model is a CAD model or a CAD/CAM model.

According to farther exemplary embodiments, a rapid prototyping method is proposed comprising: —producing a green body according to any one of the preceding embodiments, and —sintering the green body. This method advantageously allows the preparation of a ceramic article having a density that is not usually attainable by conventional methods for manufacturing a ceramic from the green body. For example, the binder may be an inorganic component, or the binder may comprise an organic component that is pyrolysed to yield an inorganic component during sintering, thereby lending the sintered ceramic greater density and strength.

A moulded body that is constructed one layer at a time by slip deposition typically has a density greater than 60% v/v of the theoretical density of the ceramic or ceramic mixture used. In the case of aluminum oxide ($Al_2O_3$) with a theoretical density of 3.94 g·cm$^{-3}$, this means that $Al_2O_3$ green bodies that are constructed in layers by slip deposition have to density greater than 2.36 g·cm$^{-3}$.

The embodiments described above may be combined with each other in any way.

A significant inventive step consists in the production of ceramic, but also metallic and/or polymeric green sheets via a combination of a laser method, which is similar to localised laser sintering, wherein the powder particles are not sintered, however, but solidified, for example by using a laser-curable binder that is either already contained in the suspension, a ceramic slip for example, or which permeates an at least partially dried layer, for example a dried ceramic layer, or passes through said layer.

According to typical embodiments, a ceramic slip is initially pressed out of a storage vessel and through a hollow doctor blade with a gap width of 500 μm for example by a suitable conveyor device.

The hollow doctor blade consists of a closed volume with two openings: a hose port for delivering the slip and a slit-shaped outlet opening for discharging the slip. The volume is designed so as to enable the slip that is fed in through the hose port to be discharged uniformly and consistently through the slit-moulded outlet opening. The slit-moulded outlet opening extends substantially across the width of the doctor blade. The slip emerging from the slit is spread to form a layer of defined thickness by the doctor blade.

According to preferred embodiments of the suggested method, the layer with defined thickness obtained in this way has a constant thickness. An significant feature of a layer of defined thickness obtained in this way consists in that each deposited layer has a constant height over its entire extent and is thus particularly characterized by an even, uncorrugated and accordingly flat surface. Each layer created with the hollow doctor blade according to the suggested method is thus characterized in that it advantageously comprises an even uncorrugated surface.

Consequently, the moulded body obtained consists entirely of layers that are intrinsically flat and it is therefore free from corrugations, since each slip layer is always applied to a completely flat surface. This provides particular advantages for even drying and the thereby reached uniform adhesion of subsequently superposed layers.

An exemplary embodiment of the doctor blade consists of two parallel rectangular panels arranged at a defined distance from one another. The rectangular panels are sealed off from one another on three sides, so that an open cavity is formed on one side. The open side, or the single-sided opening orate hollow blade, serves as a slit-like outlet opening for the slip, wherein the slip may be supplied via a hose on one of the panels.

In this case, the hose port may be designed for example such that one of the panels has an opening that is directed towards the open cavity and opens into a hose nipple or other type of connector for a hose that supplies the slip on the outside of the panel.

A manipulator moves the doctor blade with the outlet aperture facing the heated ceramic panel at a distance of about 1-300 μm above said panel, so that the suspension is applied in a thin layer. The panel surface is initially at a temperature below 100° C. to prevent the water content in the suspension from boiling when water-based slips are used during deposition of the first layers. As the number of layers increases, the temperature can be raised significantly, since the layers deposited previously are highly absorbent and initially extract the moisture from the new layer within fractions of a second. Each new layer is stabilised thereby, and the moisture is evaporated in less than 30 seconds.

Besides drying from below via the heated panel, a radiant heater may be used in combination with a fan. Additional drying from above is necessary, because the fragments produced have an insulating effect and thus cause the temperature of the upper layers to be too low to enable satisfactorily rapid drying as the thickness of the layer structure increases. The density of the green sheets that are producible by this method is about 65%, which is thus comparable to conventionally produced green bodies. In this context, the density of the green body is understood to be the quotient of the mass of the green body and its volume, calculated on the basis of the outer contours of the green body.

Similarly, a moulded body consisting of green sheets may also be produced by using a dispersion or suspension of polymer particles and/or metal particles similar to the ceramic slip to construct the layers. The temperatures used to dehumidify a layer containing polymer particles (heater panel, fan) are adapted to the respective glass transition temperatures of the polymer in question.

Unlike the known LSD method, after this a binder is sprayed onto the green sheet obtained using a spray technology. The binder wets the ceramic particles and permeates the green sheet or passes through the green sheet. This penetration of the layer is essential in order to connect all the particles in the layer cross-section and to locally bind the top layer to underlying layers. The quantity of sprayed-on binder is such that the binder can penetrate to a desired depth in the body composed of green sheets. The depth of penetration of the binder selected in each case depends on the layer thickness of a single deposited layer and the desired degree of penetration of the binder into deeper layers.

Also, the binder may be introduced into the dried layer by dipping the dried layer into the liquid binder, into a liquid containing the binder in dissolved form, or by dipping it into a suspension of the binder.

Alternatively, the binder may already be contained in the particle suspension used to generate the layer, but in a concentration that is substantially below that typically used for stereolithography, that is to say below 10%.

The binder has the property that it can be thermally or photonically cured and/or thermally or photonically cross-linked after spraying, and so it can be thermally cured or crosslinked in locally limited manner by laser radiation for example, or cured and crosslinked. The powder particles of the material used to construct the layer are thus bonded volumetrically by the curing/crosslinking binder.

Without the step of thermally or photonically initiated curing/crosslinking, the binder has little or no bonding action for the powder particles, and this is of no value for the process. With its thermally or photonically initiated curing/crosslinking, the binder ensures permanent bonding of the powder particles of the suspension.

After completion of the thermal or photonic curing or cross-linking by laser radiation, a new layer with a thickness from 1-500 μm, preferably from 5 to 300 μm, particularly from 25 to 150 μm is applied and dehumidified, then binder is applied and cured/crosslinked again. In this way, a component is built up by the addition of successive layers. After completion of the build-up phase, the green body, which now consists of a plurality of layers, is placed in a water bath or other medium that dissolves and/or washes out the part of the green body that has not been cured/crosslinked by the binder. The binder-free areas of the green body dissolve completely and the component emerges from the green body.

The properties of the component that is generated in this manner are equivalent to those of a conventional green body, of which the pore volume is partly filled with a binder. When an organic binder is used, the binder is easily driven out when the body is sintered. In the case of an inorganic binder, for example is system based on colloidal $SiO_2$ solution, the density of the green body obtained thereby may be even higher than with a conventionally prepared ceramic, polymeric or metallic green body.

Moreover, for the first time in a generative manufacturing process, such as rapid prototyping, ceramic/metallic/polymeric green bodies can be generated that have a density comparable to or even greater than conventionally produced green bodies, without the need to implement a printing technology similar to 3D printing.

It is usually very difficult if not impossible to produce ceramic components having properties comparable to conventionally manufactured ceramic components if the green bodies used have different properties from those of the conventionally prepared green bodies. By way of example, a ceramic green body may be considered that has been produced by stereolithography. With an organic content of up to 60% v/v, said green body may be better characterised as ceramic-filled polymer. The organic content matter must be driven out in elaborate binder removal processes before the actual sintering process can begin. Depending on the part geometry, the binder removal processes can result in defects in the green body, which cannot generally be corrected by subsequent sintering.

3D printing results in green bodies having low density due to the low bulk density of the ceramic powders. It is not usually possible to generate dense ceramics from these green bodies by sintering. In 3D printing, airborne powder particles from the loose powder layer constantly contaminate the print head and clog up the print jets. When extremely fine ceramic powders are used, in order to enhance sintering activity or to create a particularly fine crystalline microstructure in the ceramic component for example, these negative effects are very often compounded further.

In the LSD method of DE 101 28 664, green sheets having a density comparable to that of as conventional green body are generated by deposition of the slip one layer at a time. However, laser sintering gives rise to highly anisotropic properties in the resulting prototype, and locally intense overheating can cause side effects such as blistering, the undesirable formation of glassy or ceramic phases and similar. The LSD method therefore cannot be used to produce components that are comparable to conventionally prepared green bodies or to densely sintered ceramic.

Merely the method described in U.S. Pat. No. 5,596,224 B1 is suitable for generating green bodies with properties that are comparable with those of as conventionally prepared green body. However, the disadvantage of this method is that the layers are not generated with a defined thickness, so difficulties are encountered when transferring layer information directly from the virtual model, which functions with consistent layer thicknesses and which is required for the construction. Moreover, print heads are used to apply the required binder, but there is currently no print head development specifically for additive manufacturing processes, and the print heads that are available binder continuous use in rapid prototyping methods because the print jets frequently become clogged and blocked.

The density of the green bodies that are obtainable with the suggested rapid prototyping method is similar that of the green bodies prepared by conventional methods, and is equal to or even surpasses them when inorganic binding agents are used. Since the slip used for producing the prototype and the dispersion system used may have the same composition as the slip for the final product that is modeled from the prototype, the suggested method enables the production of ceramic components, for example, the significant properties of which are equal to those of conventionally produced ceramic components, without major technological effort.

Unlike the method described in U.S. Pat. No. 6,596,224, with which it is not possible to generate layers of defined thickness, the suggested rapid prototyping method may be used to produce identical thicknesses for all layers. For this reason, the layer information from the virtual model, which normally functions with uniform film thicknesses, may be transferred directly to the construction process, in contrast to the previously known methods.

Moreover, unlike the known methods, a spray technology is used to apply the binder instead of print heads. As there is currently no print head development designed specifically for additive manufacturing processes, and the available print heads consequently have many disadvantages that prevent a continuous process flow, the method described avoids the use of print head technologies entirely. The spray technology used is less prone to malfunction and enables the continuous execution of the rapid prototyping method.

The described method enables generation of green bodies with only small proportions of binders and in this respect is similar to 3D printing.

In terms of the high density of the green bodies that are obtainable thereby, the suggested method is comparable to those described in DE 101 28 664 and U.S. Pat. No. 6,596,224 B1, but does not rely on print heads to apply the binder or local heating of the powder to the sintering temperature. Consequently, with the suggested method it is possible to avoid the anisotropic properties of the green body that are inevitable when printing technology and sintering are combined.

Although specific embodiments have been presented and described herein, it is within the scope of the present invention to modify the embodiments shown without departing from the range of protection of the present invention. The following claims represent a preliminary, non-binding attempt to define the invention in general.

What is claimed is:

1. A method for producing a molded article comprising: applying a layer of particles and applying a binder for forming a shaped body, and curing the shaped body wherein the method comprises the following steps of:
   i. forming a moulded body from a metallic or ceramic material by carrying out the following steps repeatedly:
      a. applying a layer of a suspension of metallic or ceramic particles that have been dispersed in a suspension fluid, in a working volume; and
      b. dehumidifying the applied layer in the working volume and local application to the dehumidified layer and curing of a binding agent in accordance with a layer model of the moulded body to be produced, in such manner that particles in the dehumidified layer are adhesively bonded locally to each other and optionally also to particles in at least one layer below the dehumidified layer; and ii. demoulding the moulded body by detaching binder-free residual material from the particles bonded to each other with the aid of the binder to form a green body;

wherein the layer is generated using a hollow doctor blade.

2. The method according to claim 1, wherein the binder is applied locally in a printing device.

3. The method according to claim 1, wherein the applied layer is heated during dehumidification.

4. The method according to claim 1, wherein the moulded body is produced as a porous moulded body.

5. The method according to claim 1, wherein curing the binder involves one or more steps from the following group of steps: air-drying, supplying heat and irradiation with UV light.

6. The method according to claim 1, wherein demoulding is carried out at least partly in a liquid bath.

7. The method according to claim 1, wherein in that the moulded body is produced with a density of at least 60% v/v.

8. The method according to claim 1, wherein a green sheet is formed during application of the layer by the application of a suspension of ceramic particles.

9. The method according to claim 1, wherein the binder includes an organic binder which is not soluble in water and/or not soluble in organic solvents after curing.

10. The method according to claim 1, wherein the binder includes an inorganic binder.

11. The method according to claim 1, wherein the moulded body is sintered after demoulding.

12. The method according to claim 1, wherein the method includes locally applying corresponding to the layer model of the moulded body to be produced a liquid binder that alters the solubility of the green body, in such manner that the solubility of the moulded body is homogeneous and is different from that of the surrounding particulate material.

13. The method of claim 1, wherein
(a) the step of applying a layer includes applying a layer of a suspension containing a binder that is laser-curable and/or laser-crosslinkable;
(b) the step of curing includes curing and/or crosslinking the binder by local laser exposure; and optionally repeating steps (a) and (b), wherein an additional layer is applied to a cured and/or crosslinked layer;
(c) and the method includes washing out and/or dissolving components that have not been cured and/or cross-linked in a liquid medium to obtain a green body.

14. The method of claim 1, wherein the method includes moving the doctor blade with a manipulator.

15. A method for producing a molded article comprising the steps of:
applying a layer of particles and applying a binder for forming a shaped body, and curing the shaped body, wherein
(a) the step of applying a layer includes applying a layer of a suspension containing a binder that is laser-curable and/or laser-crosslinkable;
(b) the step of curing includes curing and/or crosslink-ing the binder by local laser exposure; and optionally repeating steps (a) and (b), wherein an additional layer is applied to a cured and/or crosslinked layer;
(c) and the method includes washing out and/or dis-solving components that have not been cured and/or crosslinked in a liquid medium to obtain a green body, wherein the layer is generated using a hollow doctor blade.

16. The method according to claim 15, wherein the layer is generated utilizing the suspension in which the binder is contained, wherein a solid content of the suspension is selected from the group consisting of a polymer, a metal, a ceramic material and a mixture containing at least one polymer, one metal or one ceramic material.

17. The method according to claim 15, wherein the generation of the layer involves at least partial penetration of a binder into a dehumidified layer of a suspension that does not contain any binder.

18. The method according to claim 17, wherein the penetration of the binder is effected by spraying the dehumidified layer with the binder and/or by immersing the dehumidified layer in the binder or in a liquid containing the binder.

19. The method according to claim 15,
wherein the cured and/or crosslinked binder is not soluble in the liquid medium; and
wherein the medium comprises water and/or an organic solvent; and
wherein the organic solvent is selected from the group consisting of acetone, cyclohexane, dioxane, n-hexane, n-octane, toluene, trichloroethanol, dimethyl ethyl ketone, isopropanol, ethyl alcohol, methyl ethyl ketone, and mixtures obtained therefrom.

20. The method according to claim 16,
wherein a density of the green body is at least 60% of the average material density of a solid portion of the suspension, when the density of the green body is defined as the quotient from a mass of the green body and a volume calculated on the basis of exterior contours of the green body; and
wherein the dimensions of layer correspond to the dimension information of a layer model that is constructed one layer at a time.

21. A device for producing a metallic or ceramic moulded body, comprising:
i. a storage volume that is configured to accommodate a suspension of metallic or ceramic particles that are dispersed in a suspension fluid,
ii. a layer-forming application device including a hollow doctor blade for repeatedly applying the suspension from the storage volume to a working volume; and
iii. a binding agent application device configured to apply a binder locally to the layer in accordance with a layer model of the moulded body to be produced after dehumidifying the layers, so that particles in the dehumidified layer are adhesively bonded locally to one another.

22. The device of claim 21,
wherein the layer-forming application device is configured to repeatedly remove a quantity of suspension from the storage volume as a layer,
wherein the device includes a dehumidifier that is configured to dehumidify the applied layer in the working volume, and
a demoulding device that is configured to demould the moulded body by detaching the binder-free residual material from the particles bonded to each other with the aid of the binder.

* * * * *

UNITED STATES PATENT AND TRADEMARK OFFICE
CERTIFICATE OF CORRECTION

PATENT NO. : 9,757,801 B2  
APPLICATION NO. : 14/123187  
DATED : September 12, 2017  
INVENTOR(S) : Gunster et al.

Page 1 of 1

It is certified that error appears in the above-identified patent and that said Letters Patent is hereby corrected as shown below:

In the Claims

Column 16, Line 56-57 insert:
--and transfer said quantity to a working volume, and to apply it to the working volume-- after "storage volume" and before "as a layer,"

Signed and Sealed this
Sixth Day of February, 2018

Joseph Matal
*Performing the Functions and Duties of the*
*Under Secretary of Commerce for Intellectual Property and*
*Director of the United States Patent and Trademark Office*